US010647319B2

(12) United States Patent
Sato et al.

(10) Patent No.: US 10,647,319 B2
(45) Date of Patent: May 12, 2020

(54) TRAVEL CONTROL METHOD AND TRAVEL CONTROL DEVICE

(71) Applicant: Nissan Motor Co., Ltd., Yokohama-shi, Kanagawa (JP)

(72) Inventors: Ko Sato, Kanagawa (JP); Masahiro Kobayashi, Kanagawa (JP); Yasuhisa Taira, Kanagawa (JP); Osamu Fukata, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/315,403

(22) PCT Filed: Jun. 6, 2017

(86) PCT No.: PCT/JP2017/020920
§ 371 (c)(1),
(2) Date: Jan. 4, 2019

(87) PCT Pub. No.: WO2018/008317
PCT Pub. Date: Jan. 11, 2018

(65) Prior Publication Data
US 2019/0256092 A1 Aug. 22, 2019

(30) Foreign Application Priority Data
Jul. 5, 2016 (JP) ................................. 2016-133354

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/18* (2013.01); *B60W 10/20* (2013.01);
(Continued)

(58) Field of Classification Search
CPC .... B62D 15/025; B62D 15/026; B60R 21/00; G06T 2207/30256; G08G 1/16; G08G 1/167
See application file for complete search history.

(56) References Cited

U.S. PATENT DOCUMENTS 8,346,427 B2   1/2013   Kobayashi
2009/0271071 A1 * 10/2009 Buerkel ............. B60T 8/17557
                                                            701/41
(Continued)

FOREIGN PATENT DOCUMENTS

JP   2009214786 A    9/2009
JP   2015172903 A   10/2015
WO   2015195282 A1  12/2015

*Primary Examiner* — Thomas G Black
*Assistant Examiner* — Ce Li Li
(74) *Attorney, Agent, or Firm* — Young Basile Hanlon & MacFarlane, P.C.

(57) ABSTRACT

A travel control method of the present invention includes: recognizing the lane in which the host vehicle is traveling; controlling the travel of the host vehicle such that the host vehicle is situated at a predetermined position relative to a boundary line of the lane; detecting an increase in the lane width of the lane in which the host vehicle is traveling; and, if determining that one of the boundary lines situated to the left and the right of the host vehicle is a dashed line, controlling the travel of the host vehicle based on the dashed boundary line.

4 Claims, 3 Drawing Sheets

(51) Int. Cl.
*B60W 10/18* (2012.01)
*B62D 6/00* (2006.01)
*B60W 30/18* (2012.01)

(52) U.S. Cl.
CPC ......... *B60W 30/18154* (2013.01); *B62D 6/00* (2013.01); *B60W 2400/00* (2013.01); *B60W 2420/42* (2013.01); *B60W 2420/52* (2013.01); *B60W 2520/10* (2013.01); *B60W 2552/05* (2020.02); *B60W 2555/60* (2020.02); *B60W 2556/60* (2020.02); *B60W 2710/06* (2013.01); *B60W 2710/18* (2013.01); *B60W 2710/20* (2013.01)

(56) References Cited

U.S. PATENT DOCUMENTS

| | | | |
|---|---|---|---|
| 2011/0010021 A1 | 1/2011 | Kobayashi | |
| 2012/0212612 A1* | 8/2012 | Imai | G06K 9/00798 348/148 |
| 2014/0229106 A1* | 8/2014 | Ishikawa | G01C 21/3647 701/533 |
| 2015/0262020 A1* | 9/2015 | Kataoka | G06K 9/00798 382/104 |
| 2015/0310283 A1* | 10/2015 | Mori | B60W 30/12 382/104 |
| 2015/0367778 A1* | 12/2015 | Vladimerou | G06K 9/00798 348/148 |
| 2016/0003628 A1* | 1/2016 | Osanai | G06K 9/00798 701/532 |
| 2017/0248959 A1* | 8/2017 | Matsubara | G05D 1/0088 |
| 2017/0351926 A1* | 12/2017 | Nagase | B60W 30/18145 |
| 2018/0273089 A1* | 9/2018 | Isomoto | B62D 6/001 |

* cited by examiner

TRAVEL CONTROL METHOD AND TRAVEL CONTROL DEVICE

CROSS REFERENCE TO RELATED APPLICATION

The present application claims priority to Japanese Patent Application No. 2016-133354, filed Jul. 5, 2016, incorporated herein in its entirety.

TECHNICAL FIELD

The present invention relates to a travel control method and device that recognizes the lane in which the host vehicle is traveling and controls the travel of the host vehicle such that the host vehicle is situated at a predetermined position relative to a boundary line of the lane.

BACKGROUND

Japanese Patent Application Publication No. 2009-214786 discloses a conventional vehicle travel support device that supports travel by recognizing the lane marks on the left and right of the road. When the distance between the left and right lane marks increases as the road branches off, the vehicle travel support device in Japanese Patent Application Publication No. 2009-214786 supports the travel by using the lane mark, as a reference, that extends along the road on which the vehicle is planned to travel.

Here, at a right turn lane on a local road, an exit lane on a freeway, or the like, the lane width increases along the planned travel road. Specifically, at the entrance of a right turn lane or the entrance of an exit lane on a freeway, a solid line representing the boundary between the road and a shoulder, the centerline of the road, or the like shifts outward along the planned travel road, thereby increasing the lane width. Thus, when the lane width increases at the entrance of a right turn lane on a local road or the entrance of an exit lane on a freeway, the above conventional vehicle travel support device supports the travel based on the solid line shifting outward, so that the vehicle will be guided toward the right side if there is the right turn lane and toward the left side if there is the exit lane. For this reason, there has been a problem of being unable to control the host vehicle to travel at an appropriate position within its lane.

SUMMARY

The present invention has been proposed in view of the above circumstances, and an object thereof is to provide a travel control method and device that can control the host vehicle to travel at an appropriate position within its lane in a scene where the lane width increases, such as a right turn lane on a local road, an exit on a freeway, or the like.

To solve the above problem, a travel control method and device according to an aspect of the present invention, if the lane width of the lane in which the host vehicle is traveling increases and it is determined that one of the boundary lines situated to the left and the right of the host vehicle is a dashed line, control the travel of the host vehicle based on the dashed boundary line.

According to the present invention, the host vehicle can be controlled to travel at an appropriate position within its lane in a case where one of the boundary lines situated to the left and the right of the host vehicle is a dashed line in a scene where the lane width increases.

DETAILED DESCRIPTION

One embodiment to which the present invention is applied will be described below with reference to the drawings.

[Configuration of Travel Control System]

Figure 1:
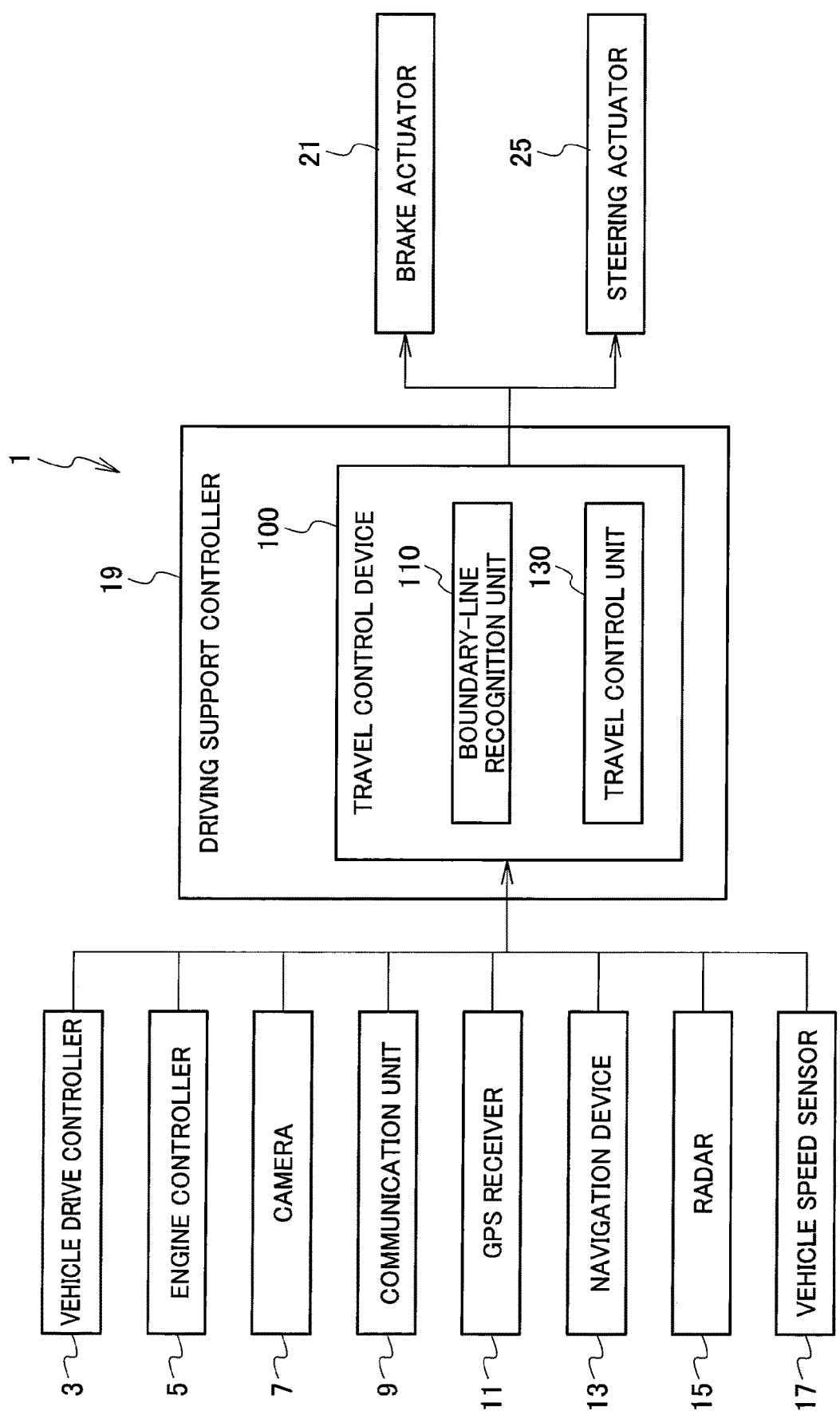
FIG. 1 is a block diagram illustrating the configuration of a travel control system including a travel control device according to one embodiment of the present invention.

FIG. 1 is a block diagram illustrating the configuration of a travel control system including a travel control device according to this embodiment. As illustrated in FIG. 1, a travel control system 1 according to this embodiment includes a vehicle drive controller 3, an engine controller 5, a camera 7, a communication unit 9, a GPS receiver 11, a navigation device 13, a radar 15, and a vehicle speed sensor 17. The travel control system 1 also includes a driving support controller 19, a brake actuator 21, and a steering actuator 25. Further, the driving support controller 19 includes a travel control device 100. The travel control system 1 with this configuration is installed on a vehicle, and the vehicle with the travel control system 1 installed thereon is equipped with driving support systems such as an adaptive cruise control and a lane keep support.

The vehicle drive controller 3 includes systems that controls the drive of the vehicle, such as an anti-lock braking system, a traction control system, and a vehicle dynamics control. The engine controller 5 is a controller that controls the engine. The camera 7 images the surroundings of the host vehicle and obtains an image in which preceding vehicles and the boundary lines of lanes are captured. The image captured by the camera 7 is used to obtain information such as the inter-vehicle distances and relative speeds between the host vehicle and preceding vehicles and the positions of the boundary lines. The communication unit 9 performs road-to-vehicle communication and reception and transmission of an information communication service using a mobile phone line. The GPS receiver 11 receives information on the latitude, longitude, and altitude of the host vehicle from a satellite. The navigation device 13 electronically stores map information, detects the location of the host vehicle, and computes a navigation route to a destination. The radar 15 measures the inter-vehicle distances and relative speeds between preceding vehicles and the host vehicle by using millimeter waves. The vehicle speed sensor 17 measures the vehicle speed of the host vehicle.

The driving support controller 19 controls driving support systems such as an adaptive cruise control, an emergency brake and an auto-hold brake, and an autonomous driving system. In particular, the driving support controller 19 has a lane departure prevention function (lane keep support function) to recognize the lane in which the host vehicle is traveling and control the travel of the host vehicle such that the host vehicle is situated at a predetermined position relative to a boundary line of the lane. Also, the driving support controller 19 may include a system including an adaptive cruise control with a steering control function added thereto. The driving support controller 19 detects the presence or absence of any preceding vehicle, detects the boundary lines (detects lanes), measures the inter-vehicle distances, and measures the lateral position of the host vehicle relative to each boundary line by using the camera 7 and the radar 15. Moreover, the driving support controller 19 controls the lateral position of the host vehicle by sending instructions to the brake actuator 21 and the steering actuator 25. When there is no preceding vehicle, the driving support controller 19 performs vehicle speed control that causes the host vehicle to travel constantly at a set vehicle speed. When there is a preceding vehicle, the driving support controller 19 performs inter-vehicle distance maintaining control that causes the host vehicle to travel while maintaining a constant inter-vehicle distance to the preceding vehicle. When the preceding vehicle stops, the driving support controller 19 performs control that causes the host vehicle to stop as well and remain stopped.

The brake actuator 21 performs a braking operation for controlling the braking of the host vehicle upon receipt of an instruction from the driving support controller 19. The steering actuator 25 performs a steering operation for controlling the lateral position of the host vehicle upon receipt of an instruction from the driving support controller 19.

The travel control device 100 is installed in the driving support controller 19, and recognizes the lane in which the host vehicle is traveling and controls the travel of the host vehicle such that the host vehicle is situated at a predetermined position relative to a boundary line of the lane, in cooperation with the driving support controller 19. In particular, the travel control device 100 monitors whether or not the lane width of the lane in which the host vehicle is traveling has increased, while the lane keep support function of the driving support controller 19 is executed. Assume that the travel control device 100 detects an increase in the lane width of the lane in which the host vehicle is traveling. In this case, if determining that one of the boundary lines situated to the left and the right of the host vehicle is a dashed line (e.g. if the boundary lines situated to the left and the right of the host vehicle are a combination of a dashed line and a solid line), the travel control device 100 controls the travel of the host vehicle based on the dashed boundary line. Meanwhile, if it is impossible to determine that one of the boundary lines situated to the left and the right of the host vehicle is a dashed line (e.g. if the boundary lines situated to the left and the right of the host vehicle are not a combination of a dashed line and a solid line), the travel control device 100 controls the travel of the host vehicle based on the boundary line on the oncoming vehicle side (to the right of the host vehicle in the case of left-hand traffic) on condition that the host vehicle is on a freeway, whereas the travel control device 100 controls the travel of the host vehicle based on the boundary line on the side opposite from oncoming vehicles (to the left of the host vehicle in the case of left-hand traffic) on condition that the host vehicle is on a local road. The travel control device 100 with such a function includes a boundary-line recognition unit 110 and a travel control unit 130.

The boundary-line recognition unit 110 recognizes the boundary lines of the lane in which the host vehicle is traveling by obtaining an image captured with the camera 7. Specifically, the boundary-line recognition unit 110 recognizes the positions of the boundary lines situated to the left and the right of the host vehicle by detecting the positions of edge points of the boundary lines at which the brightness changes greatly in the acquired image. Further, the boundary-line recognition unit 110 can also recognize the line types of the boundary lines situated to the left and the right of the host vehicle and distinguish between a solid line and a dashed line. Furthermore, the boundary-line recognition unit 110 can recognize the color of each boundary line, e.g. whether it is a white line or a yellow line. After recognizing the positions of the boundary lines in the above manner, the boundary-line recognition unit 110 monitors the positions of the boundary lines while the host vehicle travels, to thereby determine whether or not the distance between the boundary lines situated to the left and the right of the host vehicle, i.e. the lane width of the lane in which the host vehicle is traveling has increased.

If the boundary-line recognition unit 110 detects an increase in the lane width of the lane in which the host vehicle is traveling, the travel control unit 130 controls the travel in accordance with the line types of the boundary lines situated to the left and the right of the host vehicle. Specifically, if the boundary lines situated to the left and the right of the host vehicle are a combination of a dashed line and a solid line, the travel control unit 130 controls the travel of the host vehicle based on the dashed boundary line. In other words, the travel control unit 130 causes the host vehicle to travel with the lane keep support function executed with respect to the dashed boundary line among the boundary lines situated to the left and the right of the host vehicle. On the other hand, if the boundary lines situated to the left and the right of the host vehicle are not a combination of a dashed line and a solid line, the travel control unit 130 causes the host vehicle to travel with the lane keep support function executed with respect to the boundary line to the right of the host vehicle while the host vehicle is traveling on a freeway, whereas the travel control unit 130 causes the host vehicle to travel with the lane keep support function executed with respect to the boundary line to the left of the host vehicle while the host vehicle is traveling on a local road.

Note that the travel control device 100 is configured of a general-purpose electronic circuit including a microcomputer, a microprocessor, and a CPU and a peripheral device such as a memory. Further, by executing a specific program, the travel control device 100 operates as the above-described boundary-line recognition unit 110 and travel control unit 130. Each of these functions of the travel control device 100 can be implemented with one or more processing circuits. Examples of the processing circuits include programmed processing devices such as processing devices including electric circuits, and also include devices such as application specific integrated circuits (ASICs) arranged to execute the functions described in the embodiment and conventional circuit components.

[Procedure of Travel Control Process]

Next, the procedure of the travel control process by the travel control device 100 according to this embodiment will be described with reference to a flowchart in FIG. 2. The travel control process illustrated in FIG. 2 is a process performed while the driving support controller 19 is executing the lane keep support function.

Figure 2:
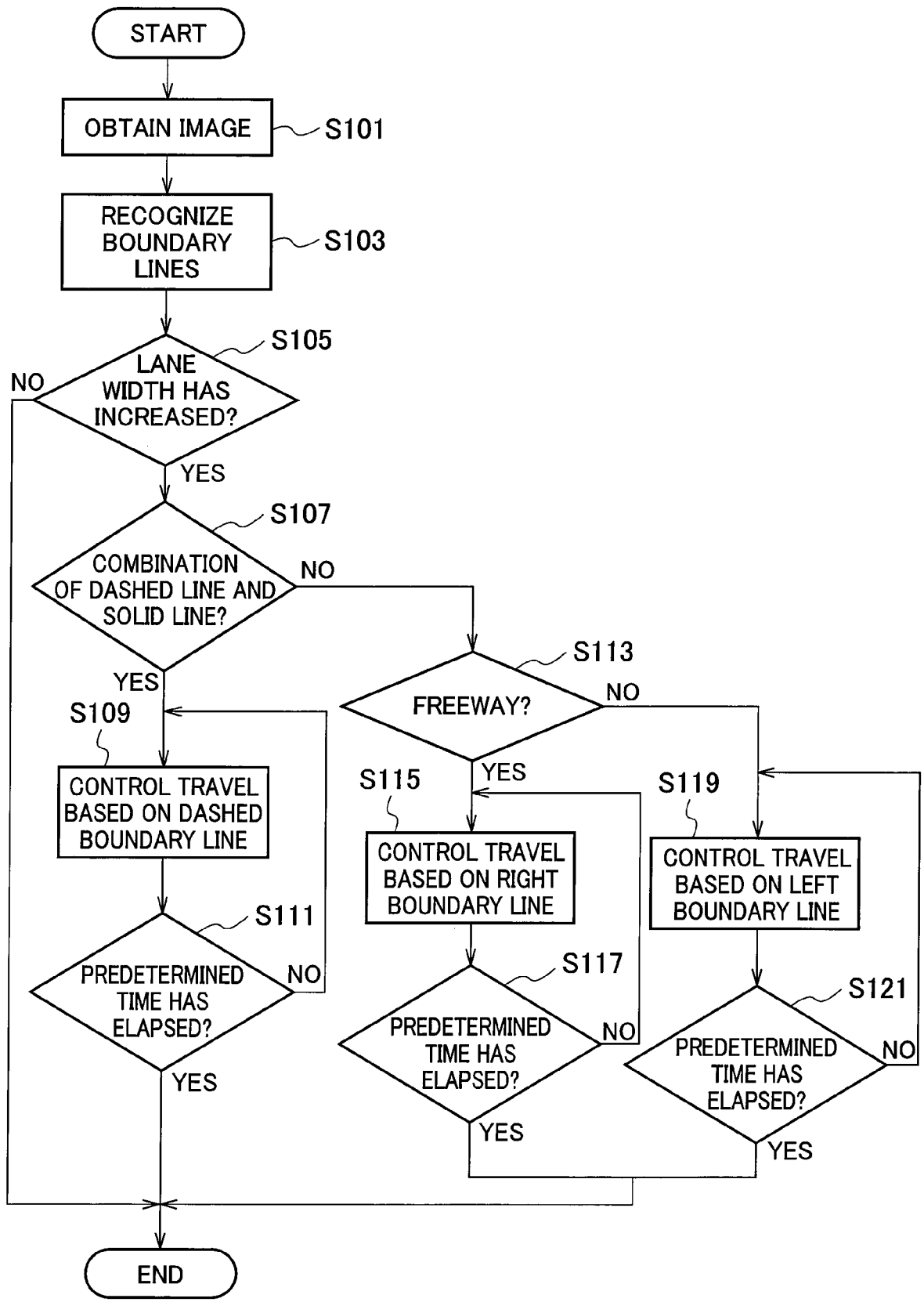
FIG. 2 is a flowchart illustrating the procedure of processing in a travel control process by the travel control device according to the one embodiment of the present invention.

As illustrated in FIG. 2, first in step S101, the boundary-line recognition unit 110 obtains an image captured with the camera 7.

In step S103, the boundary-line recognition unit 110 analyzes the obtained image to detect the boundary lines situated to the left and the right of the host vehicle and recognize the positions of the boundary lines. In doing so, the boundary-line recognition unit 110 also distinguishes and recognizes whether the line type of each boundary line is a solid line or a dashed line, and also recognizes the colors of each boundary line, e.g. whether it is a white line or a yellow line.

In step S105, the boundary-line recognition unit 110 determines whether or not the lane width of the lane in which the host vehicle is traveling has increased. The boundary-line recognition unit 110 determines whether or not the lane width of the lane in which the host vehicle is traveling has increased by monitoring the positions of the boundary lines situated to the left and the right of the host vehicle and determining whether or not the distance between the boundary lines has increased.

Figure 3:
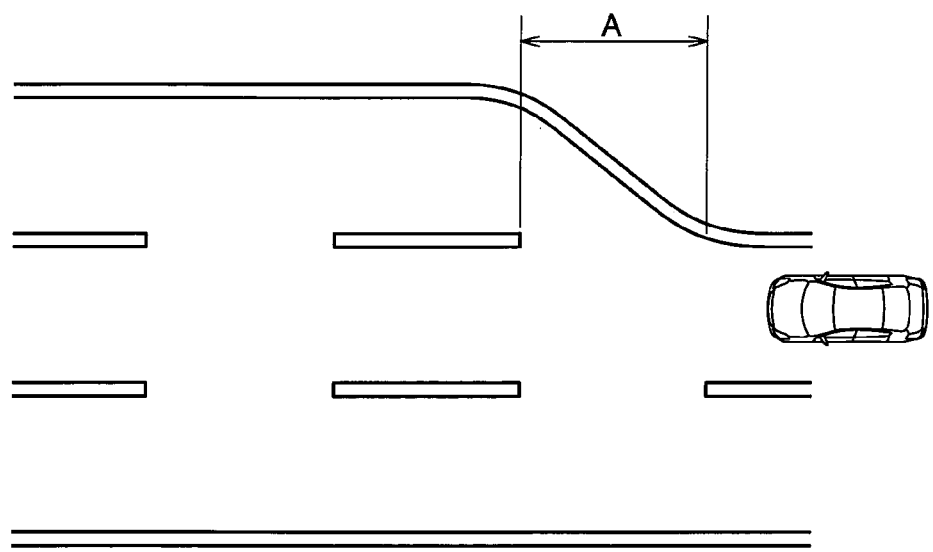
FIG. 3 is a diagram for explaining a travel control method by the travel control device according to the one embodiment of the present invention.

For example, as illustrated in FIG. 3, in a situation where the host vehicle is traveling on a local road, the lane width of the lane in which the host vehicle is traveling increases toward the right side in a section A at a part where a right turn lane starts. Similarly, at a part of a freeway where an exit lane starts, the lane width of the lane in which the host vehicle is traveling increases toward the left side. The boundary-line recognition unit 110 detects these increases in lane width. If the lane width has not increased, the boundary-line recognition unit 110 terminates the travel control process in this embodiment, and the driving support controller 19 executes the normal lane keep support function. On the other hand, if the lane width has increased, the boundary-line recognition unit 110 proceeds to step S107.

In step S107, the boundary-line recognition unit 110 determines whether or not the boundary lines situated to the left and the right of the host vehicle are a combination of a dashed line and a solid line. As illustrated in FIG. 3, in the section A, the boundary line to the right of the host vehicle is a solid line and the boundary line to the left is a dashed line. Similarly, at the entrance of an exit lane on a freeway, the lane to the left of the host vehicle is a solid line and the lane to the right is a dashed line. Then, if the boundary lines situated to the left and the right of the host vehicle are a combination of a dashed line and a solid line as illustrated in FIG. 3, the boundary-line recognition unit 110 proceeds to step S109. On the other hand, if the boundary lines situated to the left and the right of the host vehicle are not a combination of a dashed line and a solid line, that is, if the boundary lines situated to the left and the right of the host vehicle are a combination of a dashed line and a dashed line or a combination of a solid line and a solid line, the boundary-line recognition unit 110 proceeds to step S113.

In step S109, the travel control unit 130 controls the travel of the host vehicle based on the dashed boundary line. In other words, the travel control unit 130 executes lane keep control with respect to the dashed boundary line. As illustrated in FIG. 3, on a local road, if the boundary lines situated to the left and the right of the host vehicle are a combination of a dashed line and a solid line, the dashed line represents the boundary between multiple traffic lanes, and the solid line represents the centerline of the road. Also, at the entrance of an exit lane on a freeway, the dashed line represents the boundary between multiple traffic lanes, and the solid line represents the boundary between a shoulder and the road. Thus, in either case, the dashed line represents the boundary between multiple traffic lanes and is a boundary line indicating the road on which the host vehicle is currently traveling. On the other hand, the solid line is a boundary line indicating a lane outside the road on which the host vehicle is currently traveling, such as a right turn lane or an exit lane on a freeway. Thus, if the lane width between the boundary lines situated to the left and the right of the host vehicle increases and the boundary lines appear as a combination of a dashed line and a solid line, the travel control unit 130 controls the travel of the host vehicle based on the dashed boundary line. In this way, the host vehicle can continue traveling on the road on which it is currently traveling.

In step S111, the travel control unit 130 determines whether or not a predetermined time has elapsed, in order to determine whether or not the host vehicle has passed the section A in FIG. 3. The lane width increases until the host vehicle passes the section A. Thus, if the predetermined time has not passed, the travel control unit 130 returns to step S109 and continues controlling the travel of the host vehicle based on the dashed boundary line. On the other hand, once the host vehicle passes the section A, boundary lines can be recognized by the left and the right of the host vehicle and therefore the normal lane keep control can be executed. Thus, if the predetermined time has elapsed, the travel control unit 130 terminates the travel control process in this embodiment, and the driving support controller 19 executes the normal lane keep support function.

In step S113, the travel control unit 130 obtains information from the GPS receiver 11 and the navigation device 13 and determines whether or not the current location of the host vehicle is on a freeway. Here, the travel control unit 130 proceeds to step S115 if the current location is on a freeway, and proceeds to step S119 if the current location is not on a freeway but on a local road.

In step S115, the travel control unit 130 controls the travel of the host vehicle based on the boundary line to the right of the host vehicle. In other words, the travel control unit 130 executes lane keep control with respect to the boundary line to the right of the host vehicle. When the lane width of the lane in which the host vehicle is traveling increases while the host vehicle on a freeway, the host vehicle is likely to be at the entrance of an exit lane on the freeway. Thus, the travel control unit 130 executes lane keep control with respect to the boundary line to the right of the host vehicle to prevent the host vehicle from being guided toward the left side and traveling toward the exit of the freeway.

In step S117, the travel control unit 130 determines whether or not the predetermined time has elapsed, in order to determine whether or not the host vehicle has passed the section A in FIG. 3. The lane width increases until the host vehicle passes the section A. Thus, if the predetermined time has not passed, the travel control unit 130 returns to step S115 and continues controlling the travel of the host vehicle based on the right boundary line. On the other hand, once the host vehicle passes the section A, boundary lines can be recognized by the left and the right of the host vehicle and therefore the normal lane keep control can be executed. Thus, if the predetermined time has elapsed, the travel control unit 130 terminates the travel control process in this embodiment, and the driving support controller 19 executes the normal lane keep support function.

In step S119, the travel control unit 130 controls the travel of the host vehicle based on the boundary line to the left of the host vehicle. In other words, the travel control unit 130 executes lane keep control with respect to the boundary line to the left of the host vehicle. When the lane width of the lane in which the host vehicle is traveling increases while the host vehicle on a local road, the host vehicle is likely to be at the entrance of a right turn lane. Thus, the travel control unit 130 executes lane keep control with respect to the boundary line to the left of the host vehicle to prevent the host vehicle from being guided toward the right side and traveling toward the right turn lane.

In step S121, the travel control unit 130 determines whether or not the predetermined time has elapsed, in order to determine whether or not the host vehicle has passed the section A in FIG. 3. The lane width increases until the host vehicle passes the section A. Thus, if the predetermined time has not passed, the travel control unit 130 returns to step S119 and continues controlling the travel of the host vehicle based on the left boundary line. On the other hand, once the host vehicle passes the section A, boundary lines can be recognized by the left and the right of the host vehicle and therefore the normal lane keep control can be executed. Thus, if the predetermined time has elapsed, the travel control unit 130 terminates the travel control process in this embodiment, and the driving support controller 19 executes the normal lane keep support function.

Advantageous Effect of Embodiment

As described above in detail, if detecting an increase in the lane width of the lane in which the host vehicle is traveling and determining that one of the boundary lines situated to the left and the right of the host vehicle is a dashed line (e.g. the boundary lines situated to the left and the right of the host vehicle are a combination of a dashed line and a solid line), the travel control device 100 according to this embodiment controls the travel of the host vehicle based on the dashed boundary line. In this way, the host vehicle can be controlled to travel at an appropriate position within its lane even when the lane width increases at the entrance of a right turn lane on a local road or the entrance of an exit lane on a freeway.

For example, as illustrated in FIG. 3, in the section A at the entrance of a right turn lane, the lane width increases. Then, performing lane keep control to make the host vehicle travel at the center of its lane will result in moving the host vehicle toward the right side and fail to control the host vehicle to travel at the appropriate position within its lane. However, if the boundary lines situated to the left and the right of the host vehicle are a combination of a dashed line and a solid line when the lane width increases, the travel control device 100 according to this embodiment controls the travel of the host vehicle based on the dashed boundary line. As illustrated in FIG. 3, if the boundary lines situated to the left and the right of the host vehicle are a combination of a dashed line and a solid line, the dashed line represents the boundary between multiple traffic lanes. Then, by executing lane keep control based on the dashed boundary line, the host vehicle can continue traveling on the road on which it is currently traveling. Also, by executing lane keep control based on the dashed boundary line, the host vehicle will not move toward the right side and therefore the host vehicle can be controlled to travel at the appropriate position within its lane.

Also, if it is impossible to determine that one of the boundary lines situated to the left and the right of the host vehicle is a dashed line (e.g. if the boundary lines situated to the left and the right of the host vehicle are not a combination of a dashed line and a solid line), the travel control device 100 according to this embodiment controls the travel of the host vehicle based on the boundary line on the oncoming vehicle side (to the right of the host vehicle in the case of left-hand traffic) on condition that the host vehicle is on a freeway, whereas the travel control device 100 controls the travel of the host vehicle based on the boundary line on the side opposite from oncoming vehicles (to the left of the host vehicle in the case of left-hand traffic) on condition that the host vehicle is on a local road. Thus, the host vehicle can be controlled to travel at the appropriate position within its lane when the lane width increases at the entrance of a right turn lane on a local road or the entrance of an exit lane on a freeway even if the boundary lines situated to the left and the right of the host vehicle are not a combination of a dashed line and a solid line (e.g. even if it is impossible to recognize a dashed line or both of the boundary lines are dashed lines).

Note that the above embodiment is an example of the present invention. The present invention is therefore not limited to the above embodiment but various changes can be made in accordance with the design and so on as modes other than this embodiment without departing from the technical idea of the present invention, as a matter of course.

REFERENCE SIGNS LIST 1 travel control system
3 vehicle drive controller
5 engine controller
7 camera
9 communication unit
11 GPS receiver
13 navigation device
15 radar
17 vehicle speed sensor
19 driving support controller
21 brake actuator
25 steering actuator
100 travel control device
110 boundary-line recognition unit
130 travel control unit

The invention claimed is:

1. A travel control method by which a travel control device recognizes a lane in which a host vehicle is traveling and controls travel of the host vehicle such that the host vehicle is situated at a predetermined position relative to a boundary line of the lane, the travel control method comprising:
recognizing boundary lines situated to a left and a right of the host vehicle;
determining a lane width of the lane in which the host vehicle is traveling;
determining that the lane width has increased;
detecting boundary lines situated to the left and the right of the host vehicle are a combination of a dashed line and another dashed line or a combination of a solid line and another solid line, or detecting that both of the boundary lines situated to the left and the right of the host vehicle cannot be recognized as dashed lines;
determining that the host vehicle is traveling on a freeway; and
controlling the travel of the host vehicle based only on an oncoming vehicle side boundary line.

2. A travel control method by which a travel control device recognizes a lane in which a host vehicle is traveling and controls travel of the host vehicle such that the host vehicle is situated at a predetermined position relative to a boundary line of the lane, the travel control method comprising:
recognizing boundary lines situated to a left and a right of the host vehicle;
determining a lane width of the lane in which the host vehicle is traveling;
determining that the lane width has increased;
determining that a dashed boundary line cannot be detected;
determining that the host vehicle is traveling on a local road; and controlling the travel of the host vehicle based only on a boundary line on a side opposite from an oncoming vehicle.

3. A travel control method by which a travel control device recognizes a lane in which a host vehicle is traveling and controls travel of the host vehicle such that the host vehicle is situated at a predetermined position relative to a boundary line of the lane, the travel control method comprising:
- recognizing boundary lines situated to a left and a right of the host vehicle;
- determining a lane width of the lane in which the host vehicle is traveling;
- determining that the lane width has increased;
- determining that a dashed boundary line cannot be detected;
- determining that the host vehicle is traveling on a freeway; and
- controlling the travel of the host vehicle based only on an oncoming vehicle side boundary line.

4. A travel control device that recognizes a lane in which a host vehicle is traveling and controls travel of the host vehicle such that the host vehicle is situated at a predetermined position relative to a boundary line of the lane, the travel control device comprising:
- at least one camera; and
- a controller programmed to:
  - determine a lane width of the lane in which the host vehicle is traveling;
  - determine if the host vehicle is traveling on a freeway or a road that is not the freeway;
  - detect if a left boundary line or a right boundary line situated to a left and a right of the host vehicle, respectively, is a dashed boundary line;
  - if the lane width of the lane in which the host vehicle is traveling increases and one of the left boundary line or the right boundary line is the dashed boundary line, control the travel of the host vehicle based on the dashed boundary line; and
  - if the dashed boundary line cannot be detected and the host vehicle is determined to be traveling on the freeway, control the travel of the host vehicle based only on an oncoming vehicle side boundary line.

* * * * *